(No Model.)
W. P. TAGGART.
LINK BELT.
No. 540,199. Patented May 28, 1895.
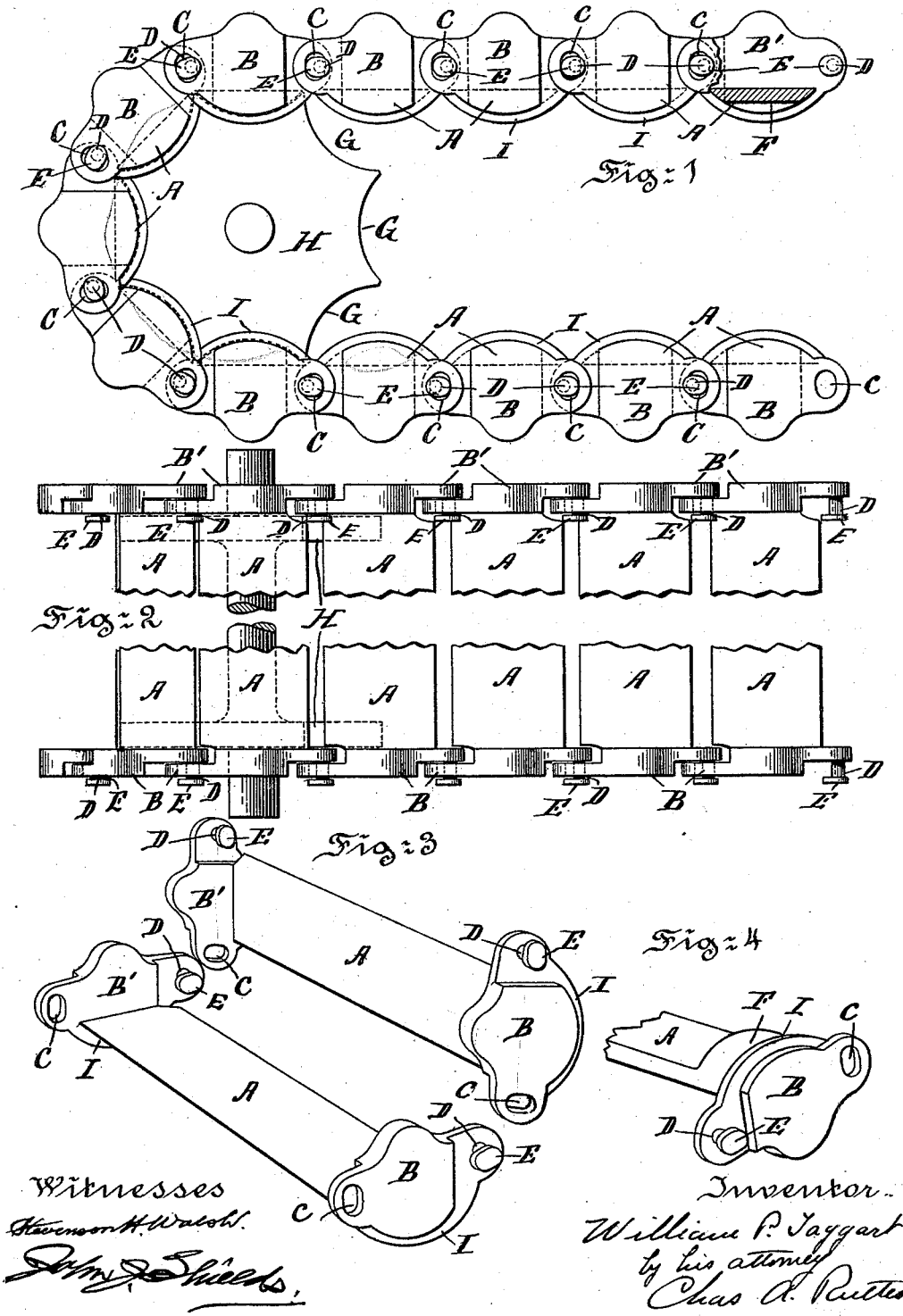
Witnesses
Inventor
William P. Taggart
by his attorney

UNITED STATES PATENT OFFICE.

WILLIAM P. TAGGART, OF PHILADELPHIA, PENNSYLVANIA, ASSIGNOR OF ONE-HALF TO THEODORE H. BECHTEL, OF SAME PLACE.

LINK BELT.

SPECIFICATION forming part of Letters Patent No. 540,199, dated May 28, 1895.

Application filed February 7, 1895. Serial No. 537,618. (No model.)

*To all whom it may concern:*

Be it known that I, WILLIAM P. TAGGART, a citizen of the United States, and a resident of the city and county of Philadelphia, State of Pennsylvania, have invented certain new and useful Improvements in Link Belts, of which the following is a specification.

My invention relates generally to improvements in link belts and the pulleys for driving the same, and more particularly to improvements in that form of link belts which are used as conveyers for carrying material from one point to another, and in the sprocket wheels for driving the same, and my invention consists in the arrangement and combination of parts as hereinafter fully set forth.

In the accompanying drawings, forming part of this specification, and in which similar letters of reference indicate similar parts throughout the several views, Figure 1 is a side elevation of part of a chain belt and a sprocket-wheel embodying my improvements; Fig. 2, a plan of Fig. 1; Fig. 3, a perspective view of two detached links of the belt, showing the means for securing the links one to the other and the positions of the links when being attached or detached; and Fig. 4, a perspective view of one end of a link, showing its under side.

The bars A' of my chain belt are furnished with sides B, B' which project upward and outward at right angles to the links to hold the material that the belt may be conveying. One of the ends of these sides is furnished with oblong slots C placed with their major axes substantially at right angles to the bars A', and the other end is furnished with pins D having oblong heads E the major axes of which are substantially parallel with the bars A' and at right angles to the major axes of the slots and which are adapted to be passed through the slots C in the adjacent link.

In order to assemble or detach the links they have to be placed substantially at right angles to one another as shown in Fig. 3, so that the axes of the slots C and of the heads D will coincide. After the heads of the pins have been passed through the slots C the links may be moved into their proper positions. Shown in Figs. 1 and 2. The shanks of the pins D which pass through the slots C hold the links together and the heads E of the pins prevent the pins from being drawn out of the slots until the links are purposely turned at right angles to one another as shown in Fig. 3.

The under parts of the links, or the ends of the under parts, are rounded as shown at F, Figs. 1 and 4, in order to be engaged by the correspondingly rounded depressions G on the periphery of the driving or carrying wheel H, Fig. 1.

I are flanges projecting downward from the sides B, B' of the links A which engage the outer faces of the sprocket wheels H and keep the chain in place upon these wheels.

Having thus described my invention, I claim—

1. The combination in a chain belt of bars the under parts of which are rounded and adapted to be engaged by correspondingly rounded depressions on the periphery of a driving or carrying wheel, sides projecting upward from and outward at right angles to said bars and having oblong slots upon one end of each side of said bars the major axes of which slots are substantially at right angles to said bars, and pins upon the other end of each of said sides furnished with oblong heads the major axes of which are substantially at right angles to the major axes of said slots.

2. The combination in a chain belt of bars the under parts of which are rounded and adapted to be engaged by correspondingly rounded depressions on the periphery of a driving or carrying wheel, sides projecting upward from and outward at right angles to said bars and having oblong slots upon one end of each side of said bars the major axes of which slots are substantially at right angles to said bars, pins upon the other end of each of said sides furnished with oblong heads the major axes of which are substantially at right angles to the major axes of said slots, and flanges projecting downward from said bars adapted to engage the outer faces of the driving or carrying wheel.

WILLIAM P. TAGGART.

Witnesses:
CHRISTOPHER FALLON,
CHAS. A. RUTTER.